US010736270B2

(12) United States Patent
Mosel et al.

(10) Patent No.: US 10,736,270 B2
(45) Date of Patent: Aug. 11, 2020

(54) ROTARY HEADER WINDGUARD

(71) Applicant: AGCO Corporation, Duluth, GA (US)

(72) Inventors: Dane Austin Mosel, Hesston, KS (US); Brendon C. Nafziger, Canton, KS (US); Nicholas H. Williams, Hesston, KS (US)

(73) Assignee: AGCO Corporation, Duluth, GA (US)

(*) Notice: Subject to any disclaimer, the term of this patent is extended or adjusted under 35 U.S.C. 154(b) by 247 days.

(21) Appl. No.: 15/855,681

(22) Filed: Dec. 27, 2017

(65) Prior Publication Data

US 2019/0191627 A1 Jun. 27, 2019

(51) Int. Cl.
*A01D 82/00* (2006.01)
*A01D 43/10* (2006.01)
*A01D 43/00* (2006.01)
*A01D 82/02* (2006.01)
*A01D 34/71* (2006.01)
*A01D 34/66* (2006.01)

(52) U.S. Cl.
CPC ........... *A01D 82/00* (2013.01); *A01D 34/664* (2013.01); *A01D 34/667* (2013.01); *A01D 34/71* (2013.01); *A01D 43/00* (2013.01); *A01D 43/10* (2013.01); *A01D 82/02* (2013.01)

(58) Field of Classification Search
CPC .... A01D 34/404; A01D 34/66; A01D 34/664; A01D 34/665; A01D 34/667; A01D 34/668; A01D 34/71; A01D 34/736; A01D 43/00; A01D 43/006; A01D 43/10; A01D 82/00; A01D 82/02; A01D 57/26
See application file for complete search history.

(56) References Cited

U.S. PATENT DOCUMENTS

| 3,596,445 | A | * | 8/1971 | Lievers | A01D 43/10 56/13.7 |
| 3,698,162 | A | * | 10/1972 | Scarnato | A01D 43/10 56/16.4 B |
| 3,835,629 | A | * | 9/1974 | Rosendahl | A01D 43/10 56/14.4 |
| 4,270,338 | A | * | 6/1981 | Halls | A01D 43/10 56/14.4 |
| 4,499,711 | A | * | 2/1985 | McLean | A01D 43/10 56/13.6 |

(Continued)

FOREIGN PATENT DOCUMENTS

DE 2225675 A1 * 12/1973 ............. A01D 43/10

*Primary Examiner* — Robert E Pezzuto
*Assistant Examiner* — Adam J Behrens

(57) ABSTRACT

A harvesting header has a set of centrally disposed conditioner rolls comprising conditioning structure to condition crop and a rotary cutter bed. The rotary cutter bed has a plurality of rotary cutters extending across the path of travel of the header to define a cutting plane, each cutter being rotatable about an upright axis, the conditioner rolls being behind the cutter bed to condition crop cut by the rotary cutter bed. The header has a crop-directing header windguard configured to direct the crop down towards the conditioning rolls after the plurality of cutters have severed the crop, the header windguard extending in a rearwardly direction from a position forward of the cutter bed to a position proximate the conditioner rolls, and the header windguard extending transversely at least a width of the rotary cutter bed.

5 Claims, 3 Drawing Sheets

(56) References Cited

U.S. PATENT DOCUMENTS

| | | | | |
|---|---|---|---|---|
| 4,516,391 | A | * | 5/1985 | McLean .................. A01D 43/10 56/16.4 R |
| 5,272,859 | A | * | 12/1993 | Pruitt ................... A01D 34/668 56/15.2 |
| 5,768,865 | A | * | 6/1998 | Rosenbalm .......... A01D 34/667 56/13.6 |
| 7,644,566 | B2 | * | 1/2010 | Diederich, Jr. ........ A01D 41/14 56/17.3 |
| 8,833,046 | B2 | * | 9/2014 | Barnett .................. A01D 34/71 56/157 |
| 2009/0313964 | A1 | * | 12/2009 | McLean .................. A01D 43/10 56/192 |
| 2014/0102067 | A1 | * | 4/2014 | Barnett .................. A01D 34/71 56/16.4 C |

\* cited by examiner

ROTARY HEADER WINDGUARD

BACKGROUND OF THE INVENTION

Field of Invention

This invention relates to crop harvesting machines of the type that use rotary cutters to sever standing crops from the field and then condition the cut crop between one or more sets of conditioning rolls before depositing the crop back onto the ground in the form of a windrow or swath and more particularly, it relates to a header that has a crop-directing header windguard configured to direct the crop down towards the conditioning rolls after the cutters have severed the crop.

Description of Related Art

Wide cut rotary harvesters present inherent challenges in getting outboard severed crop materials to flow smoothly and without hesitation in a lateral direction toward the center of the machine before then turning rearwardly and moving through the central discharge opening into the conditioner rolls. Any hesitation on the part of the crop materials as they "turn the corner" and move rearwardly into the conditioner rolls can cause a number of significant problems, both in the quality of the finished windrows and the quality of cutoff being achieved by the rotary cutters. Due to the increased speeds at which rotary harvesters can travel compared to that of sickle-type machines, cutoff, feeding and control problems are exacerbated in rotary machines due to the dramatically increased volume of cut material flowing through the machines.

In one preferred rotary cutter bed design, a group of inboard cutters of the bed are arranged with their axes of rotation directly in front of the conditioner rolls. At least one, and preferably two, additional outboard cutters are provided at each end of the bed and have their axes of rotation located outboard of the conditioning structure. The outboard cutters both rotate in the same direction, with their front extremities moving generally inwardly toward the center of the machine to convey outboard cut materials toward the inboard cutters. Most of the cutters of the inboard group are arranged in oppositely rotating pairs with other cutters of the group such that cut crop materials from the paired cutters in the inboard group are directed straight back into the conditioner rolls in a number of streams.

As the crops are cut and moved toward the crop conditioner opening, the volume of crop increases as it approaches the conditioning rolls. As the crop volume increases, it can have a tendency to be compressed in the horizontal direction and expand in the vertical direction. As this crop expands in the vertical direction, there can be a hesitation at the upper support structure. In certain crop conditions, the crop can bridge over top of the cutter bed and crop conditioning rolls and not flow through the conditioning mechanism. These conditions present drying issues along with poor quality hay in bales.

OVERVIEW OF THE INVENTION

In one embodiment, the invention is directed to a harvesting header having a set of centrally disposed conditioner rolls comprising conditioning structure to condition crop and a rotary cutter bed. The rotary cutter bed has a plurality of rotary cutters extending across the path of travel of the header to define a cutting plane, each cutter being rotatable about an upright axis, the conditioner rolls being behind the cutter bed to condition crop cut by the rotary cutter bed. The header has a crop-directing header windguard configured to direct the crop down towards the conditioning rolls after the plurality of cutters have severed the crop, the header windguard extending in a rearwardly direction from a position forward of the cutter bed to a position proximate the conditioner rolls, and the header windguard extending transversely at least a width of the rotary cutter bed.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
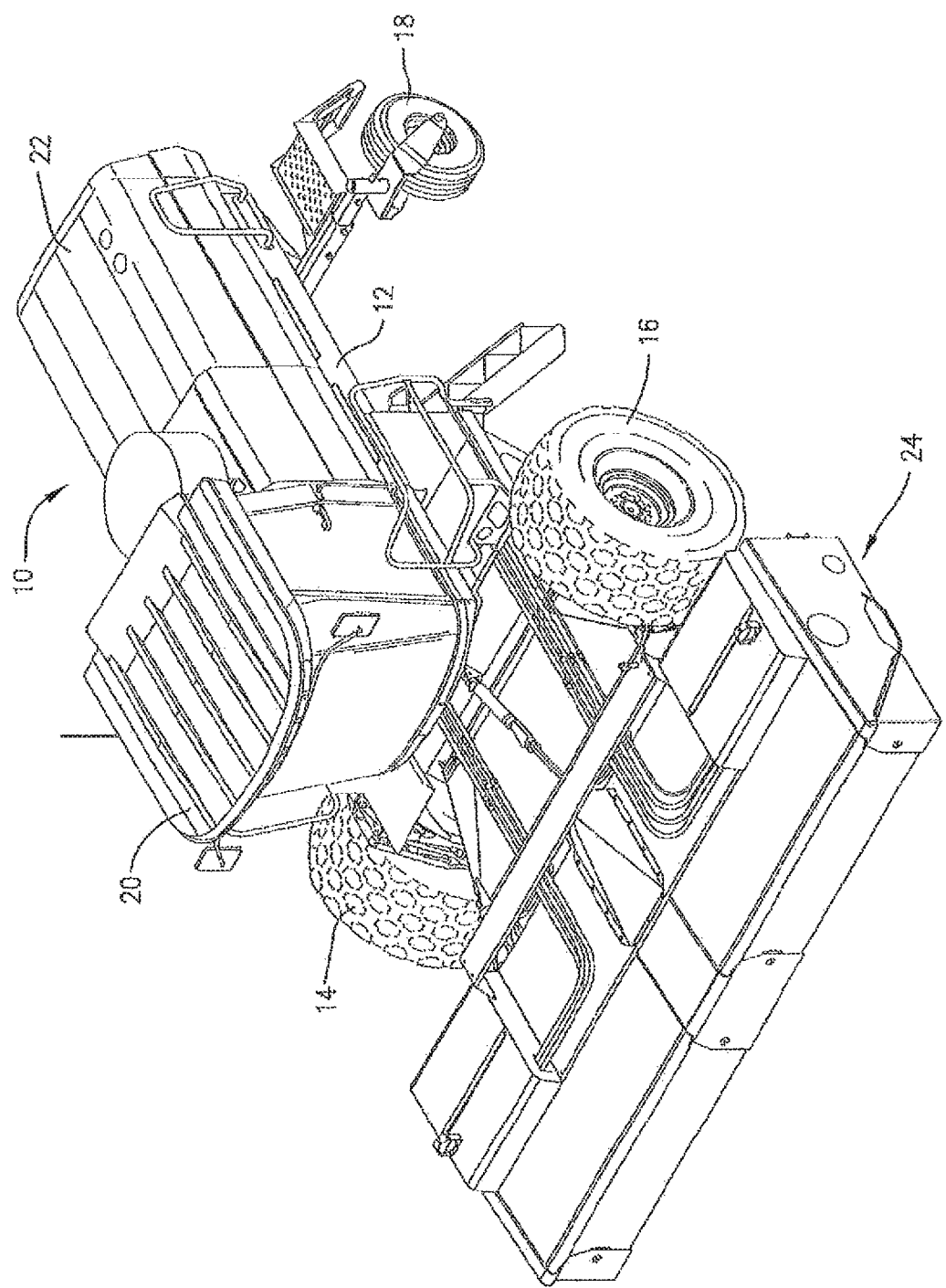
FIG. 1 is a left front perspective view of a self-propelled windrower exemplifying one type of harvesting machine that may employ a rotary cutter header in accordance with the principles of the present invention.

Referring initially to FIG. 1, the harvester selected for illustration in that figure comprises a self-propelled windrower 10 operable to mow and collect standing crop in the field, condition the cut material as it moves through the machine to improve its drying characteristics, and then return the conditioned material to the field in a windrow or swath. Windrower 10 includes a chassis or frame 12 supported by a pair of front drive wheels 14, 16 and a pair of rear caster wheels 18 (only the left rear caster wheel 18 being illustrated) for movement across a field to be harvested. Frame 12 carries a cab 20, within which an operator controls operation of windrower 10, and a rearwardly spaced compartment 22 that houses a power source (not shown) such as an internal combustion engine. A harvesting header 24 is supported on the front of frame 12 in a manner well understood by those skilled in the art.

Figure 2:
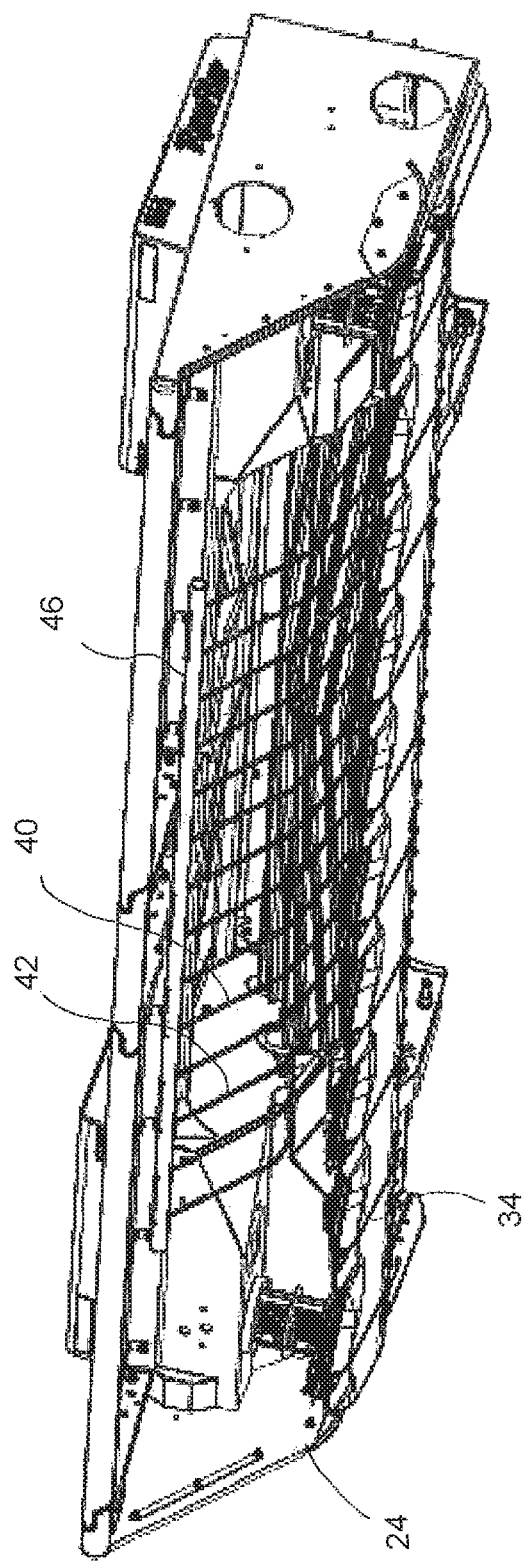
FIG. 2 is a front perspective view of the header with structure removed to reveal details of construction.

With reference to FIG. 2, the header 24 includes a rotary cutter bed 26 across the front of the machine that serves as the means by which standing crops are severed as the windrower advances across a field. In the illustrated embodiment, cutter bed 26 includes a series of rotary cutters 28 extending across the path of travel of the machine, each cutter 28 being rotatable about its own upright axis. In one embodiment, the cutter bed 26 has ten rotary cutters 28 across the width of the cutter bed. However, a larger or smaller number of cutters 28 could be provided. An exemplary cutter bed 26 and set of conditioner rolls 29 is illustrated in commonly assigned U.S. Pat. No. 7,726,108.

Figure 3:
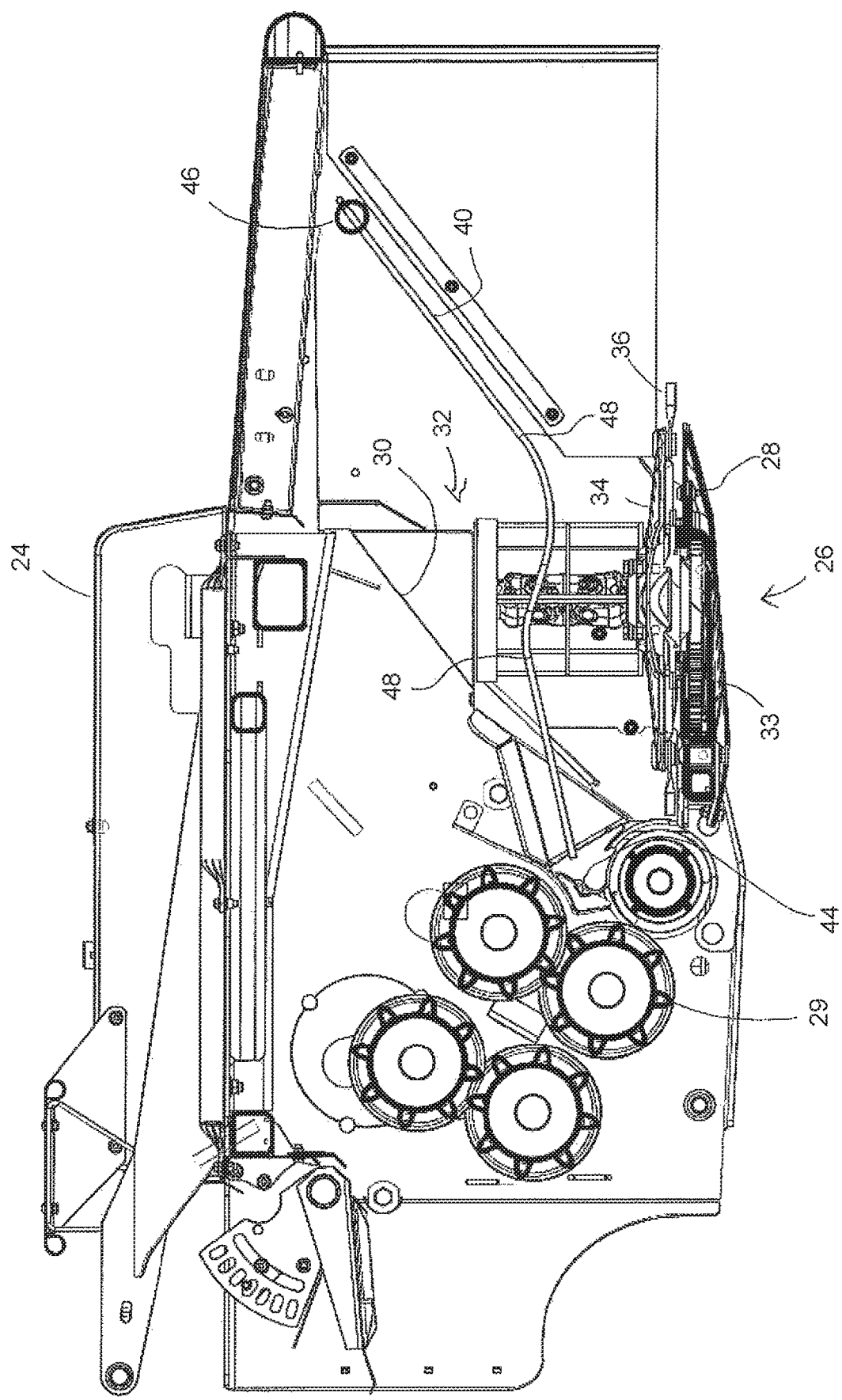
FIG. 3 is side view of the header with structure removed to reveal details of construction.

Turning also now to FIG. 3, header 24 is constructed in such a way as to present a pair of upright, laterally spaced apart panels 30 behind cutter bed 26 that define a crop conditioning region in which the set of conditioning rolls 29 is located. The front extremities of panels 30 cooperate to in part define lateral boundaries of an opening 32. In the illustrated embodiment, the set of rolls 29 includes two pairs of cooperating conditioner rolls 29, although a single pair or more than two pairs could be utilized without departing from the principles of the present invention. Conditioner rolls 29 may assume a variety of configurations without departing from the principles of the present invention. For example, the rolls could all be hard, metal rolls, or some could be softer rolls having compressible outer surfaces. While different conditioning actions are achievable with different roll configurations and materials, the particular choice of such configurations and materials is not critical insofar as the present inventive concepts are concerned. In all instances, however, the conditioner rolls will have some kind of conditioning structure on their outermost peripheral surfaces, whether such surfaces are ribbed, grooved or smooth, for example. As conditioner rolls 29 are well known in the art, they need not be discussed further herein.

Cutters 28 are rotatably supported on an elongated, flat gear case 33 that extends underneath the cutters for the full effective width of header 24 and driven by one or more hydraulic motor (not shown) as will be understood by one skilled in the art. Additionally, each of the cutters 28 includes a generally elliptical, formed metal knife carrier 34 and a pair of free-swinging knives 36 at opposite ends of carrier 34 in a well-known manner. The circular paths of travel of the knives 36 of adjacent cutters 28 overlap one another.

According to the invention, a crop-directing header windguard 40 is used to direct the crop down towards the opening of the conditioning rolls 29 after the plurality of cutters 28 have severed the crop stems. In the illustrated embodiment, the header windguard 40 comprises a series of rods 42 mounted above the cutter bed 26 and extending in a rearwardly direction from a position forward of the cutter bed 26 to a position proximate a nip 44 between adjacent conditioner rolls 29. In one embodiment, a forward end of each rod is mounted to a transversely extending crossbar 46 with the crossbar 46 positioned forward of the cutter bed 26. Alternately, the header windguard 40 may comprise a sheet made of a solid material, with or without perforations or extrusions, without departing from the scope of the invention. In another alternate embodiment, the header windguard 40 may comprise a fabric-type curtain. In yet a further embodiment, the header windguard 40 may comprise a combination of a series of rods, a sheet of solid material and a fabric-type curtain to direct the crop down towards the opening of the conditioning rolls 29 after the plurality of cutters 28 have severed the crop stems without departing from the scope of the invention.

The windguard 40 would span transversely and could extend past the discharge opening 32 of the header 24 to the extent of the full header width. The windguard 40 could be fixed or hinged from its mounting point on the cross bar 46 as well as having multiple flexible intermediate joints 48 using sound engineering judgment. The actuation and limitation of travel of the windguard 40 about a pivot point could be controlled, but not limited to: hydraulically, electronically, mechanically, manually, or a combination thereof.

This invention would assist in controlling and directing the crop mass during the intermediate stage between cutting and conditioning. It would allow for smoother crop flow and more even crop conditioning than previously seen in certain crop conditions where the crop mass does not follow the typical path from the cutting components to the conditioning mechanism(s).

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A harvesting header comprising:
   a set of centrally disposed conditioner rolls comprising conditioning structure to condition crop;
   a rotary cutter bed comprising a plurality of rotary cutters extending across a path of travel of the header to define a cutting plane, each cutter being rotatable about an upright axis, the conditioner rolls being behind the cutter bed to condition crop cut by the rotary cutter bed; and
   a crop-directing header windguard configured to direct the crop down towards the conditioning rolls after the plurality of cutters have severed the crop, the header windguard extending in a rearwardly direction from a position forward of the cutter bed to a position proximate the conditioner rolls, and the header windguard extending transversely at least a width of the rotary cutter bed, wherein the header windguard has at least one flexible intermediate joint.

2. The harvesting header of claim 1 wherein the header windguard comprises a series of rods mounted above the cutter bed and extending in a rearwardly direction from a position forward of the cutter bed to a position proximate a nip between adjacent conditioner rolls.

3. The harvesting header of claim 2 wherein a forward end of each rod is mounted to a transversely extending crossbar with the crossbar positioned forward of the cutter bed.

4. The harvesting header of claim 1 wherein the header windguard comprises at least one of a series of rods, a sheet made of a solid material, and a fabric curtain.

5. The harvesting header of claim 1 wherein the windguard is hinged from a mounting point.

\* \* \* \* \*